Figure 1:
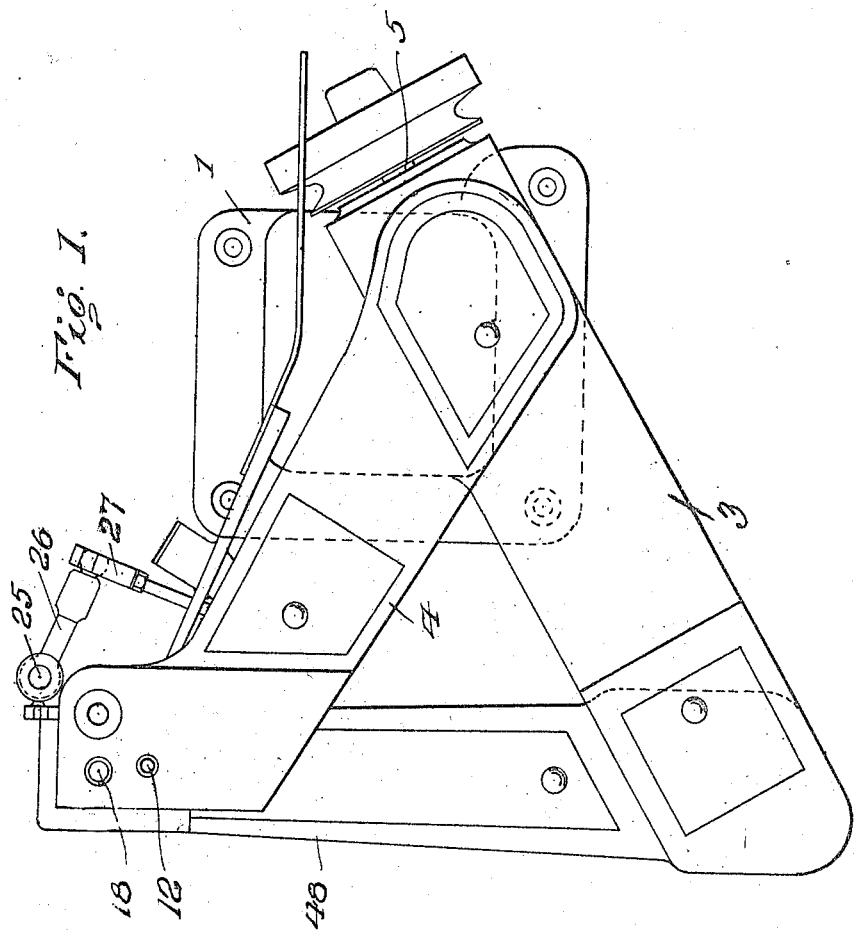

D. S. SEYMOUR.
SEWING MACHINE.
APPLICATION FILED AUG. 7, 1916.

1,238,580.

Patented Aug. 28, 1917.
9 SHEETS—SHEET 7.

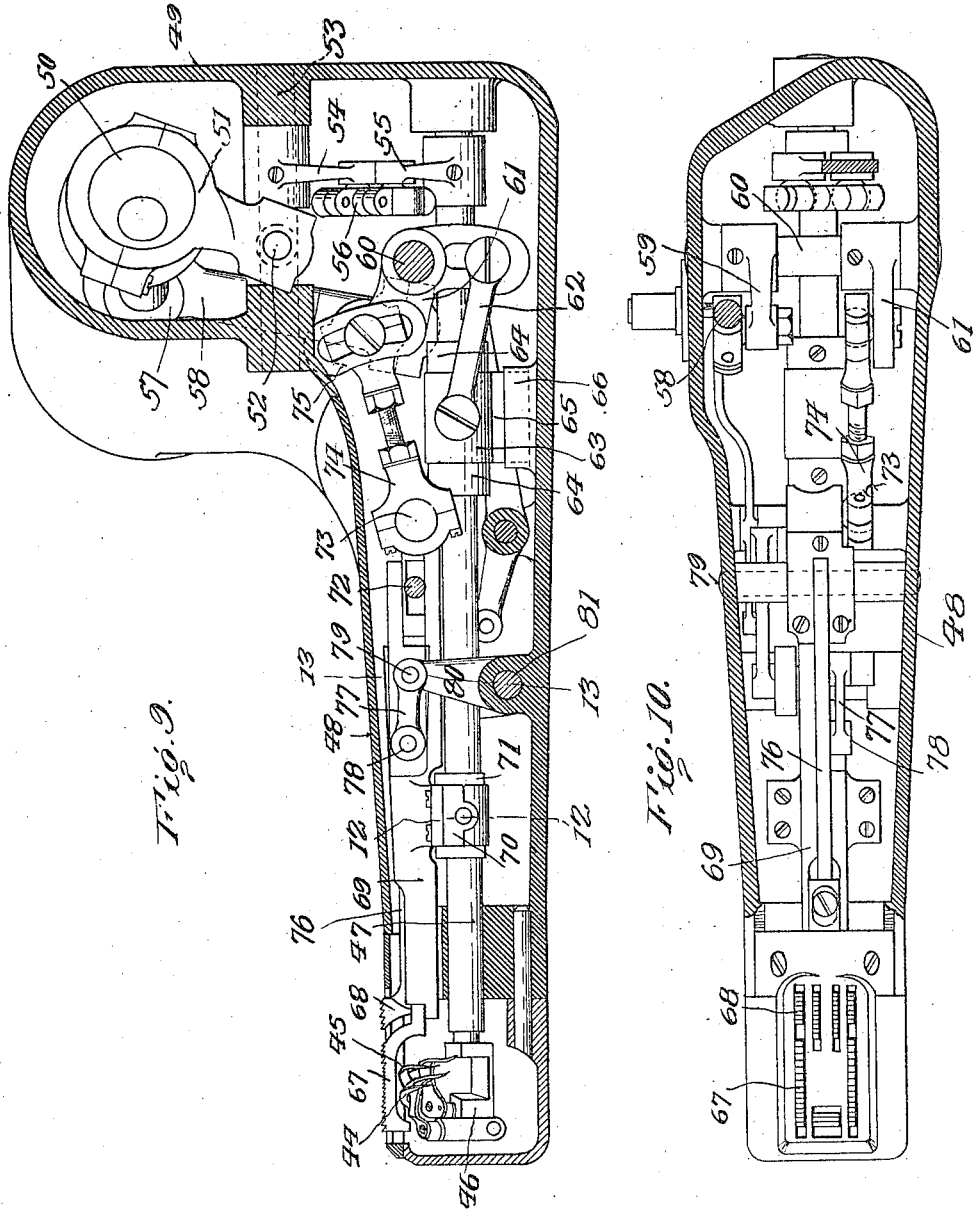

D. S. SEYMOUR.
SEWING MACHINE.
APPLICATION FILED AUG. 7, 1916.

1,238,580.

Patented Aug. 28, 1917.
9 SHEETS—SHEET 9.

WITNESSES:
Grace P. Brereton
B. B. Thompson

INVENTOR.
Dudley S. Seymour
BY Sturtevant & Mason
ATTORNEYS.

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

SEWING-MACHINE.

1,238,580.

Specification of Letters Patent.

Patented Aug. 28, 1917.

Application filed August 7, 1916. Serial No. 113,512.

*To all whom it may concern:*

Be it known that I, DUDLEY S. SEYMOUR, a citizen of the United States, residing at Oak Park, in the county of Cook, State of Illinois, have invented certain new and useful Improvements in Sewing-Machines, of which the following is a description, reference being had to the accompanying drawing and to the figures of reference marked thereon.

The invention relates to new and useful improvements in sewing machines, and more particularly to a sewing machine wherein the material being stitched is carried by a work supporting arm extending at an angle to the plane of the overhanging arm of the machine.

An object of the invention is to provide a machine of the above character having a standard for supporting a horizontal arm which carries the work supporting arm, said standard also carrying the overhanging arm, the main shaft of the machine being located in said horizontal arm and disposed in a vertical plane passing through the standard.

A further object of the invention is to provide a machine of the above character wherein the overhanging arm is provided with an oscillating shaft for actuating the parts carried by the overhanging arm, and said shaft is located in a vertical plane passing through the standard, together with devices for oscillating said shaft from the main shaft in the horizontal arm.

A still further object of the invention is to provide a machine of the above character wherein the work supporting arm is carried by a depending post and located at the outer end of the horizontal arm, and devices are provided for actuating the parts located within the work supporting arm from the end of the main shaft which projects into said depending post.

These and other objects will in part be obvious and will in part be hereinafter more fully disclosed.

In the drawings, which show by way of illustration one embodiment of the invention:—

Figure 2:
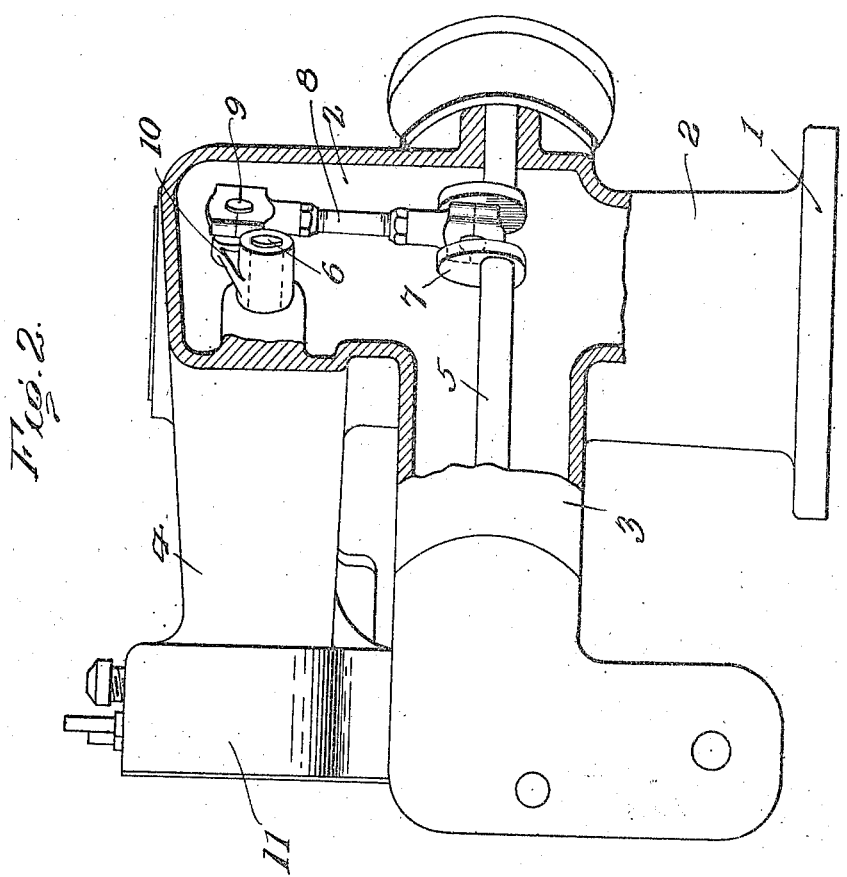
Figure 3:
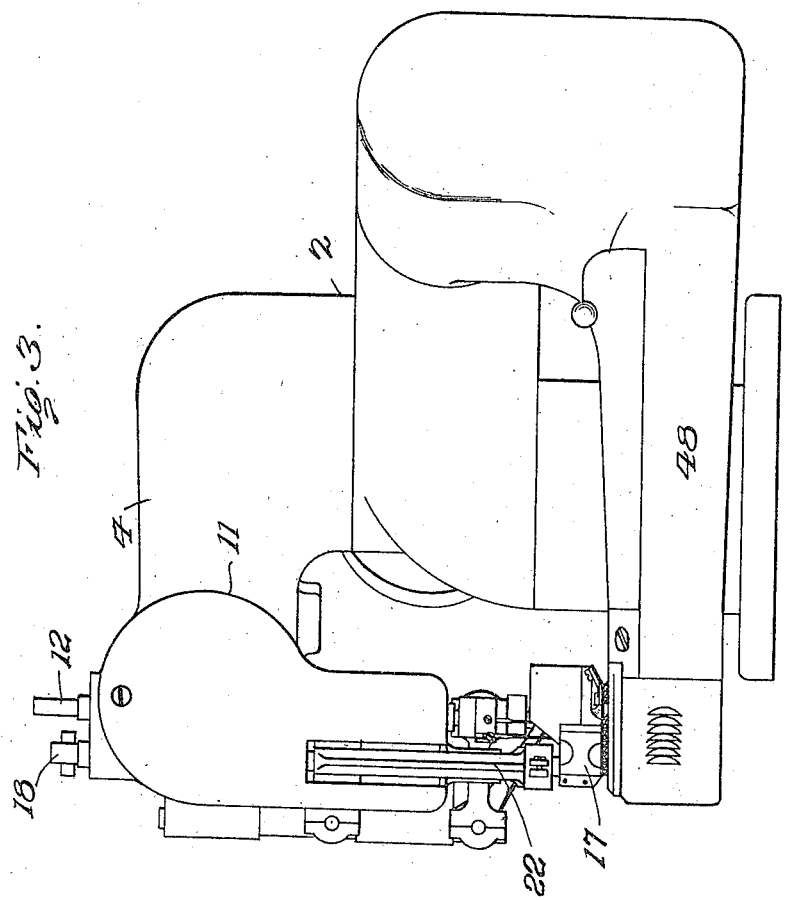
Figure 4:
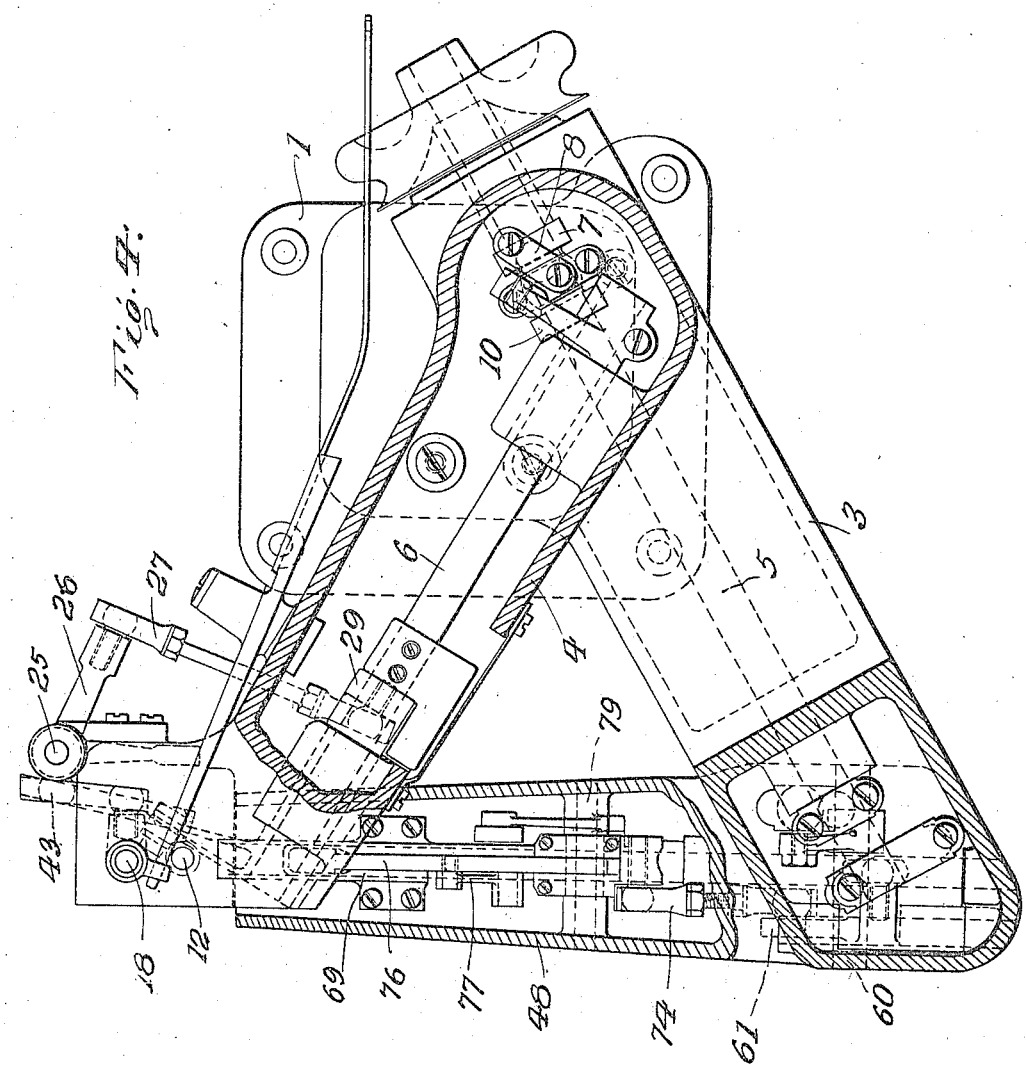
Figure 5:
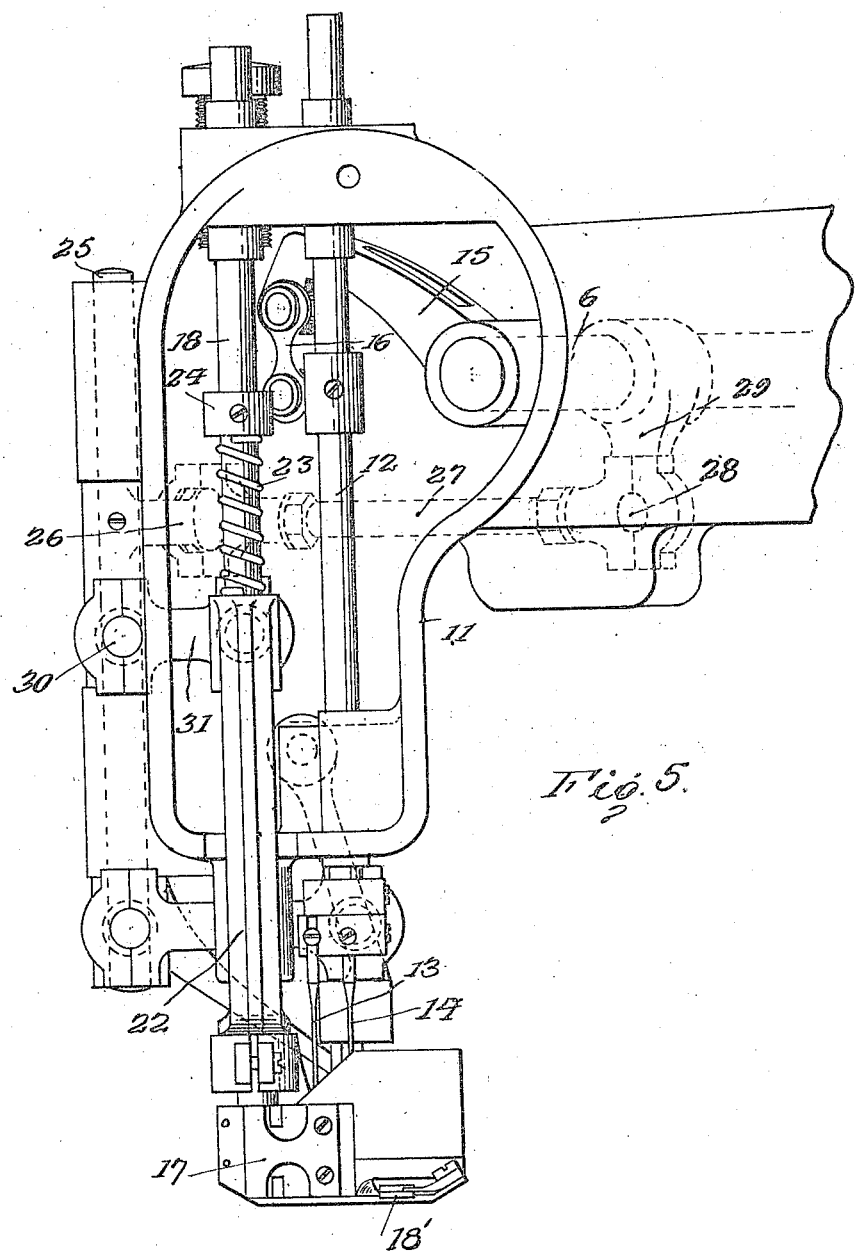
Figure 6:
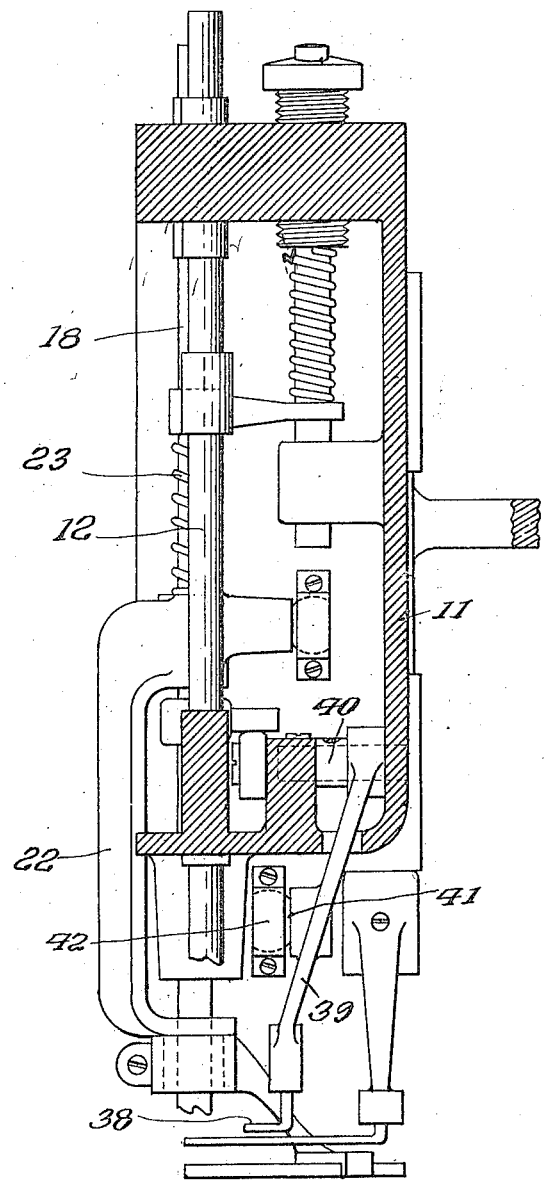
Figure 7:
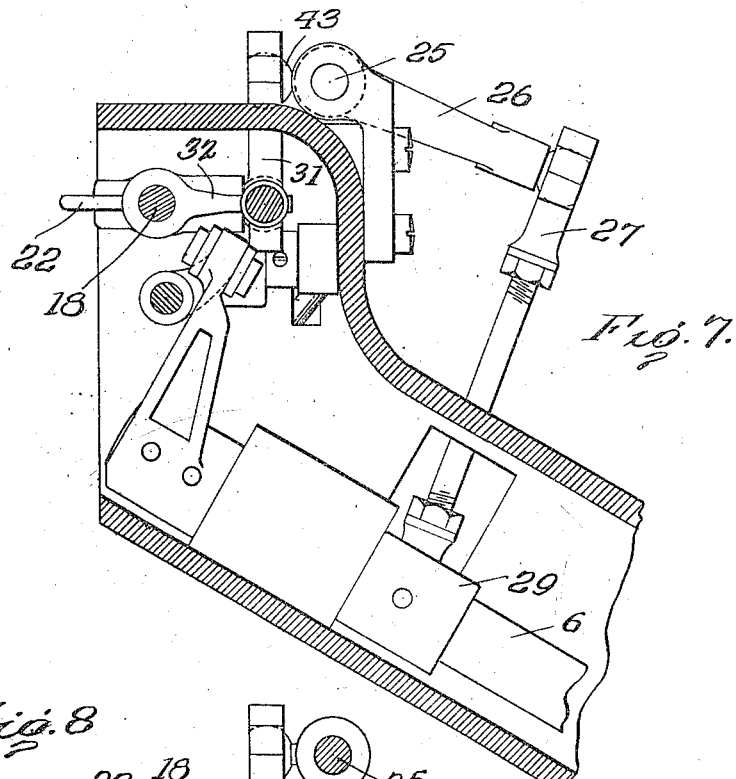
Figures 8, 14:
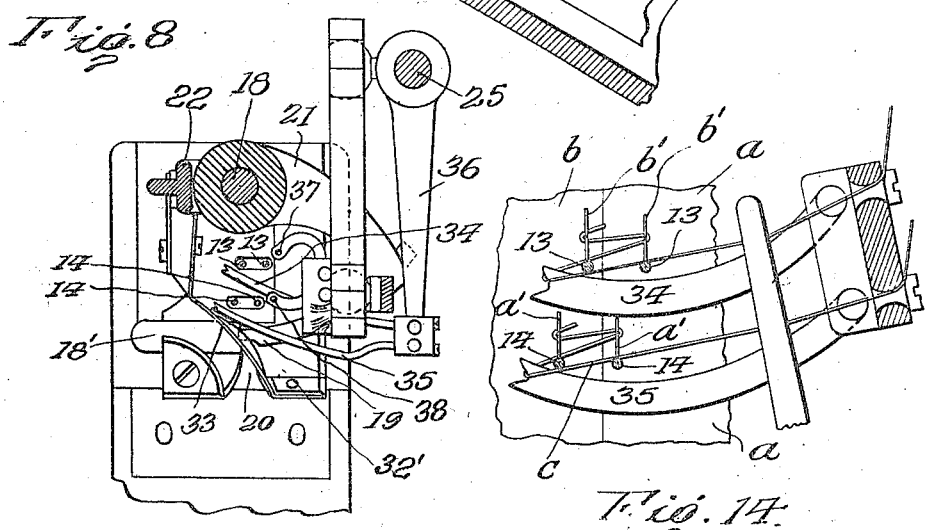
Figure 13:
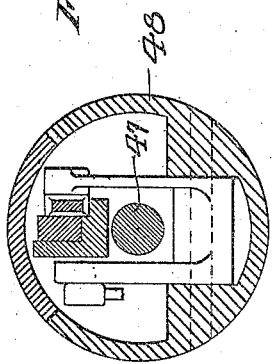
Figure 12:
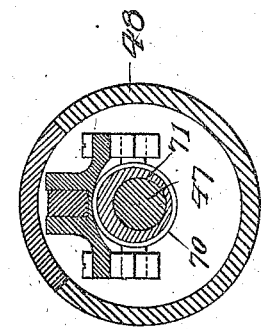
Figure 11:
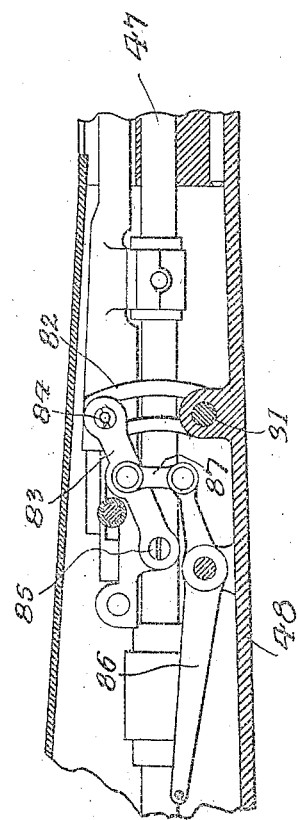

Figure 1 is a plan view of a machine embodying my improvements;

Fig. 2 is a front view of the same, certain of the actuating parts being shown in dotted lines;
Fig. 3 is a side elevation of the machine;
Fig. 4 is a horizontal sectional view through the overhanging arm, through a portion of the horizontal arm, and through a portion of the work supporting arm;
Fig. 5 is a side view showing the end of the overhanging arm with the face plate removed and the parts located thereon;
Fig. 6 is a vertical sectional view through the end of the overhanging arm, showing the trimmer operating yoke, the thread guides and the thread hooks;
Fig. 7 is a horizontal view through the end of the overhanging arm, showing the operating shaft, the needle bar, the actuating devices therefor, the trimmer yoke, the actuating devices for the trimmer yoke, and the actuating devices for the thread guides;
Fig. 8 is a horizontal sectional view showing the trimmer supporting arm, the presser foot, the end of the work support, the thread guides, and the thread hooks with the parts for supporting and oscillating the guides and hooks;
Fig. 9 is a longitudinal sectional view through the work supporting arm and depending post, showing the parts located within the arm and post;
Fig. 10 is a horizontal sectional view through the work supporting arm, but showing the throat plate in plan;
Fig. 11 is a sectional view through a portion of the work supporting arm, as viewed from the opposite side in Fig. 9;
Fig. 12 is a sectional view on the line 12—12 of Fig. 9;
Fig. 13 is a sectional view on the line 13—13 of Fig. 9;
Fig. 14 is a diagrammatic view, showing fabric sections being joined, the needles, the thread guides, the thread hooks, and the threads carried thereby.

In carrying out the invention, I have provided a supporting base carrying a standard, and projecting from this standard intermediate the upper and lower ends thereof is a horizontal arm, the longitudinal center of which is located in a vertical plane passing through the standard. Projecting from the standard at the upper end thereof is an overhanging arm, the longitudinal center of which is in a vertical plane passing through the standard so that the two vertical planes above referred to intersect in a line located within the standard. Disposed in this horizontal arm is the driving shaft. Disposed longitudinally of the overhanging arm is an oscillating shaft which is driven by suitable connections with the main shaft located in the horizontal arm. At the end of the overhanging arm there is the usual needle bar, the presser bar carrying a presser foot, a trimming mechanism, and thread laying devices, all the operating parts of which are actuated from this shaft of the overhanging arm. Depending from the horizontal arm is a vertical post which carries the work supporting arm proper. This work supporting arm extends at an angle to the vertical plane containing the main shaft and terminates directly under the free end of the overhanging arm. The work supporting arm carries the looper mechanism and the feeding mechanism, and these mechanisms are actuated through suitable connections in the depending post with the main shaft which extends into the depending post.

Referring more in detail to the drawings:—

My invention consists in a sewing machine having a supporting base 1 carrying a standard 2. Projecting from the standard 2 intermediate its upper and lower ends is a horizontal arm 3. This horizontal arm 3, as clearly shown in Fig. 1, is so disposed that the longitudinal center of the horizontal arm intersects the standard. Projecting from the upper end of the standard 2 is an overhanging arm 4, and the longitudinal center of this overhanging arm is also located in a vertical plane intersecting the standard, so that the vertical planes containing the longitudinal centers of the overhanging arm and the horizontal arm intersect each other at an acute angle and in a line located in the standard.

Mounted in suitable bearings in the horizontal arm 3 is the main driving shaft 5. This driving shaft is disposed substantially centrally of the horizontal arm. Mounted in suitable bearings in the overhanging arm is an oscillating shaft 6. The main shaft 5 is provided with a crank 7. A pitman 8 coöperates with this crank and engages a ball stud 9 carried by an arm 10 which is fixed to the end of the oscillating shaft 6. This pitman 8 is substantially vertical. The shafts 5 and 6 are at an angle to each other, but by the above disposition of the overhanging arm and the horizontal arm and the shafts mounted thereon, I am able to drive the shaft in the overhanging arm through this vertical pitman connection which is relatively short and, therefore, free from excessive vibration.

At the end of the overhanging arm 4 there is a supporting head 11 in which the needle bar 12 reciprocates. Said needle bar is provided with two pairs of needles 13 and 14, see Figs. 5 and 8. The needle bar is reciprocated from an arm 15 mounted on the ends of the shaft 6 and connected to the needle bar by a suitable link 16. The material is held on the work support by a presser foot 17 carried by a presser bar 18 mounted in the supporting head 11.

The presser foot, as shown in Fig. 8, is provided with a fixed trimming blade 18'. A movable trimming blade 19 coöperates therewith. Said presser foot is slotted at 20 to receive the up-turned edges of fabric sections which are to be united, and this trimming mechanism operates to trim said edges, after which they are turned down into flat abutted relation to each other and pass under the presser foot to the stitching mechanism. The movable trimming blade 19 is fixed to an arm 21 which is rigidly attached to a yoke 22 mounted to oscillate freely on the presser bar 18. Said yoke is pressed downwardly by a spring 23 which bears against the upper end of the yoke at one end and against a fixed collar 24 on the presser bar at the other end. Mounted in suitable bearings at the rear of the supporting head is a vertical shaft 25. This vertical shaft 25 has an arm 26 fixed thereto and the arm 26 carries a ball stud which is engaged by a link 27 and the link 27 in turn engages a ball stud 28 mounted on an arm 29 fixed to the shaft 6. Projecting laterally from the vertical shaft 25 is an arm 30 which is connected to a link 31, and this link 31 is connected at its other end to an arm 32 formed integral with the yoke 22, see Fig. 7. The spring 23 normally forces the yoke downwardly, thus yieldingly pressing the movable blade against the fixed blade. As the shaft 6 oscillates, it will in turn oscillate the yoke, and this will oscillate the movable trimming blade. The trimmed off strip is deflected away from the needles by a strip deflector 32' which is pivotally supported by the presser foot so that it may be swung to one side to permit access to the needles for threading.

While the invention is especially adapted for stitching tubular articles in which the edges are trimmed and then abutted and connected to form a flat seam, the pairs of needles are so disposed that the meeting edges pass between each pair of needles. In order to join these edges on the upper face of the material, I have provided suitable cross thread laying mechanism consisting of an oscillating hook for each pair of needles and thread guides for guiding a cross thread respectively to each hook.

In Fig. 8 of the drawings, the cross thread laying hook coöperating with the pair of needles 13 is indicated at 34, while the cross thread laying hook coöperating with the pair of needles 14 is indicated at 35. These hooks are fixed to an arm 36 which is rigidly attached to the lower end of the shaft 25 so that, as the shaft 25 oscillates, these hooks will oscillate back and forth in front of the needles. The hook 34 moves between the pairs of needles and closely in front of the needles 13, while the hook 35 moves closely in front of the needles 14. The cross thread for the hook 34 is carried by a thread guide 37, while the cross thread for the hook 35 is carried by a thread guide 38. These thread guides 37 and 38 are fixed to the lower end of a lever 39 which is fulcrumed at 40 on the supporting head 11. The lever intermediate its ends carries a ball stud 41. One end of a link 42 engages this ball stud, while the other end of this link engages a ball stud 43 on the end of the arm projecting from the vertical shaft 25. As the vertical shaft 25 oscillates, the lever 39 will swing back and forth in a plane parallel with the line of feed, and this will move the thread guides so as to position the threads carried thereby for the engagement of their respective hooks.

In Fig. 14, I have shown two fabric sections, indicated at *a* and *b*, which have been trimmed and abutted. The pairs of needles are indicated at 13 and 14, respectively. The needle threads of the needles 14—14 are indicated at *a'—a'*, while the needle threads of the needles 13—13 are indicated at *b' b'*. The thread for the thread hook 35 is indicated at *c*, while the thread for the thread hook 37 is indicated at *d*. In this view, the thread hooks are at the forward end of their strokes, having formed loops in the cross threads respectively and holding said loops while the needles move down to engage the same.

Coöperating with the needles 13—13 in the work supporting arm is a looper 44, while a looper 45 coöperates with the needles 14—14. These loopers are carried by a looper carrier 46 mounted on the end of a looper shaft 47. The looper shaft 47 is located in a work supporting arm 48 which is cylindrical in shape, and this work supporting arm is carried at the lower end of a depending post 49 mounted on the outer end of the horizontal arm 3. The shaft 5 extends into this depending post, as clearly shown in Fig. 4 of the drawings. On the other end of this shaft 5 there is an eccentric 50 and an eccentric strap 51 coöperates with the eccentric 50 and is connected to a ball stud 52 on the end of the arm carried by the cross shaft 53, shown in dotted lines in Fig. 9. Also carried by this cross shaft is a second arm 54. The looper shaft 47 carries an arm 55, and a link 56 connects the arms 54 and 55 so that, as the main shaft rotates, the eccentric 50 will oscillate the cross shaft 53, and this, through the arms 54 and 55 and connecting link 56, will oscillate the looper shaft and move the loopers out of and into the needle loops. There is a second eccentric 57 on the looper shaft and an eccentric strap 58 coöperates therewith. This eccentric strap 58 is connected to an arm 59, see Fig. 10, attached to a cross shaft 60. The cross shaft 60 carries a second arm 61 which is connected by a link 62 to a sleeve 63 on the looper shaft 47. The sleeve is held from endwise movements on the looper shaft by fixed collars 64, but the looper shaft is free to oscillate in this sleeve. Said sleeve is held from oscillation by a depending fin 65 which slides between guides 66 carried by the work supporting arm.

The material is fed to the needles by a differential feeding mechanism consisting of a main feed dog 67 and an auxiliary feed dog 68. The main feed dog is carried by a main feed bar 69. Said main feed bar is pivotally attached to a casing 70 which surrounds an eccentric sleeve 71 on the looper shaft 47. The rear end of the main feed bar 69 is slidingly pivoted on a cross rod 72 so that the feed bar may be moved back and forth on this cross rod and may swing about the cross rod as a fulcrum as the eccentric sleeve 71 oscillates with the looper shaft. Pivotally attached to the rear end of the main feed dog bar 69 at a point 73 is a link 74, and this link has an adjustable connection with an arm 75 fixed to the cross shaft 60 so that as the cross shaft is oscillated the feed bar will be moved endwise and as the looper shaft is oscillated the feed bar will be raised and lowered.

The auxiliary feed dog 68 is carried by an auxiliary feed bar 76 which is mounted in a longitudinal recess in the main feed dog 69 so as to be raised and lowered therewith. A link 77 is pivoted at 78 to the auxiliary feed bar 76, and this link serves as a means for moving the auxiliary feed bar back and forth. The link is pivoted at 79 to an arm 80 carried by a cross shaft 81. The cross shaft 81 also carries a slotted arm 82. A shiftable link 83 is pivoted at 84 to a block slidable in the slot in the arm 82, and also pivoted at 85 to a lug on the main feed bar. As the main feed bar moves back and forth, this link 85 will be moved back and forth, and will oscillate the cross shaft 81, and this will impart an endwise movement to the auxiliary feed bar. The link 83 is shifted by a hand lever 86 which is connected to the link 83 by a second link 87. This hand lever may be operated in any suitable way.

From the above description, it will be apparent that I have provided a sewing machine wherein the work support is in the form of an arm suspended so that the edges of a fabric may be brought together over the arm and stitched to form a tubular article, the completed tubular article being fed off of the arm as it is being stitched. This work supporting arm is carried at the lower end of a post mounted at the free end of a horizontal arm containing the driving shaft, and the driving connections for the feeding devices and the looper extend downwardly into this depending post. In the overhanging arm there is an oscillating shaft which is operated directly from the main shaft and this oscillating shaft actuates all the operating parts carried at the free end of the overhanging arm. It will be noted that one end of the main driving shaft is connected through a direct vertical train of mechanism with the needle operating shaft, while the other end of this main shaft is connected through a vertically arranged train of mechanism with the looper operating shaft.

By the above arrangement, the distance through the train of mechanism between the main operating shaft and the parts operated at the end of the overhanging arm is practically the same as the distance through the train of mechanism between the other end of the main operating shaft and the parts operated at the end of the work supporting arm so that these trains of mechanism are in a measure balanced one against the other, the work uniformly distributed, and the vibrations in the parts have, therefore, been reduced substantially to a minimum.

It is obvious that minor changes in the details of construction and the arrangement of parts may be made without departing from the spirit of the invention, as set forth in the appended claims.

Having thus described the invention, what is claimed as new is:—

1. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in the horizontal arm, a work supporting arm carried by said horizontal arm, a feeding mechanism in said work supporting arm, devices for operating the feeding mechanism from said main shaft, needles reciprocating in the free end of the overhanging arm, means for actuating said needles from said main shaft, complemental stitch forming devices in said work supporting arm, and means for operating said complemental stitch forming devices from said main shaft.

2. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in said overhanging arm, devices located in the standard for oscillating said shaft in the overhanging arm from said main shaft, a needle bar in the end of said overhanging arm, means for reciprocating said needle bar from said oscillating shaft, complemental stitch forming mechanism in said work supporting arm, and means for operating said complemental stitch forming mechanism from said main shaft.

3. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in said overhanging arm, devices located in the standard for oscillating said shaft in the overhanging arm from said main shaft, a needle bar in the end of said overhanging arm, means for reciprocating said needle bar from said oscillating shaft, complemental stitch forming mechanism in said work supporting arm, and means for operating said complemental stitch forming mechanism from the main shaft, cross thread laying devices carried by the overhanging arm, and means for actuating said cross thread laying devices from said shaft in the overhanging arm.

4. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in said overhanging arm, devices located in the standard for oscillating said shaft in the overhanging arm from said main shaft, a needle bar in the end of said overhanging arm, means for reciprocating said needle bar from said oscillating shaft, complemental stitch forming mechanism in said work supporting arm, means for operating said complemental stitch forming mechanism from the main shaft, cross thread laying devices carried by the overhanging arm, and means for actuating said cross thread laying devices from said shaft in the overhanging arm, a trimming mechanism in the oscillating arm, and means for operating the trimming mechanism from said oscillating shaft in the overhanging arm.

5. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in the overhanging arm, means located in the standard for actuating the oscillating shaft from said main shaft, needles carried by the free end of said overhanging arm, means for reciprocating said needles from said oscillating shaft, a depending post at the free end of said horizontal arm, a work supporting arm carried by the said post and having its free end terminating underneath the free end of the overhanging arm, loopers mounted in said work supporting arm, and devices extending through said post for oscillating the loopers from said main shaft.

6. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in the overhanging arm, means located in the standard for actuating the oscillating shaft from said main shaft, needles carried by the free end of said overhanging arm, means for reciprocating said needles from said oscillating shaft, a depending post at the free end of said horizontal arm, a work supporting arm carried by the said post and having its free end terminating underneath the free end of the overhanging arm, loopers mounted in said work supporting arm, devices extending through said post for oscillating the loopers from said main shaft, a feeding mechanism located in said work supporting arm, and means operating through said post for actuating the feeding mechanism from said main shaft.

7. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in the overhanging arm, means located in the standard for actuating the oscillating shaft from said main shaft, needles carried by the free end of said overhanging arm, means for reciprocating said needles from said oscillating shaft, a depending post at the free end of said horizontal arm, a work supporting arm carried by the said post and having its free end terminating underneath the free end of the overhanging arm, loopers mounted in said work supporting arm, devices extending through said post for oscillating the loopers from said main shaft, a feeding mechanism located in said work supporting arm, means operating through said post for actuating the feeding mechanism from said main shaft, trimming mechanism supported by the overhanging arm, and means for actuating said trimming mechanism from the oscillating shaft in the overhanging arm.

8. A sewing machine including in combination, a standard, a horizontal arm carried by and projecting from the standard intermediate its ends, an overhanging arm carried by the upper end of said standard, the longitudinal center of said horizontal arm and the longitudinal center of said overhanging arm lying in vertical planes cutting each other at an acute angle and in a line located within the standard, a main shaft located in said horizontal arm, an oscillating shaft located in the overhanging arm, means located in the standard for actuating the oscillating shaft from said main shaft, needles carried by the free end of said overhanging arm, means for reciprocating said needles from said oscillating shaft, a depending post at the free end of said horizontal arm, a work supporting arm carried by the said post and having its free end terminating underneath the free end of the overhanging arm, loopers mount ed in said work supporting arm, devices extending through said post for oscillating the loopers from said main shaft, a feeding mechanism located in said work supporting arm, means operating through said post for actuating the feeding mechanism from said main shaft, trimming mechanism supported by the overhanging arm, means for actuating said trimming mechanism from the oscillating shaft in the overhanging arm, cross thread laying mechanism carried by said overhanging arm, and means for actuating said cross thread laying mechanism from the oscillating shaft in said overhanging arm.

In testimony whereof, I affix my signature, in the presence of two witnesses.

DUDLEY S. SEYMOUR.

Witnesses:
S. GEORGE TATE,
A. F. BREDSHALL.